UNITED STATES PATENT OFFICE.

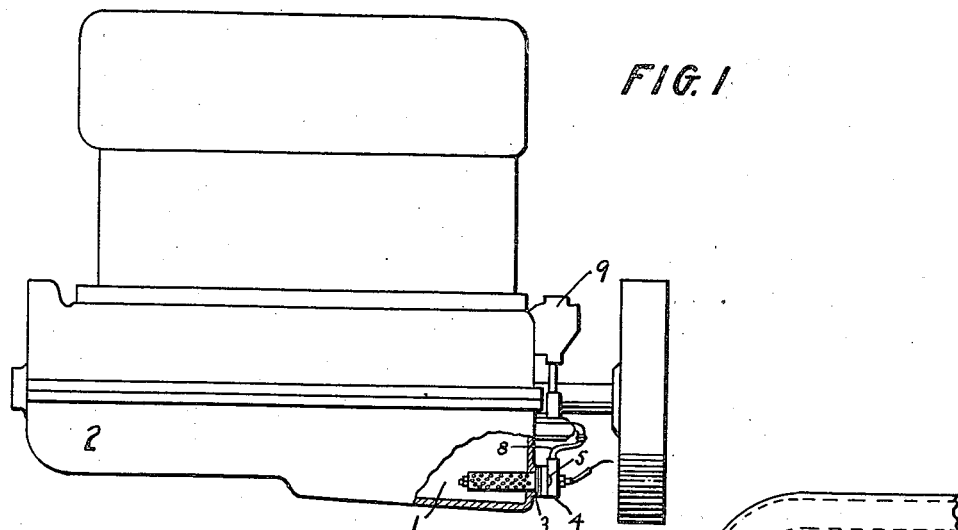
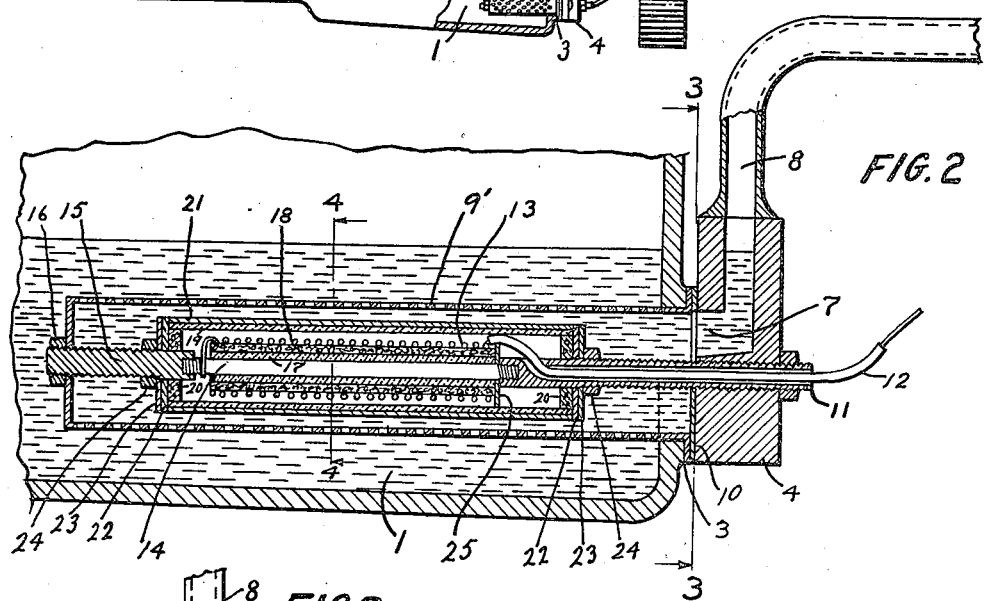
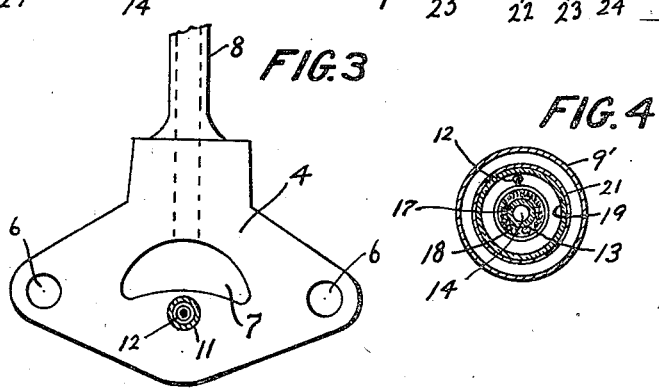
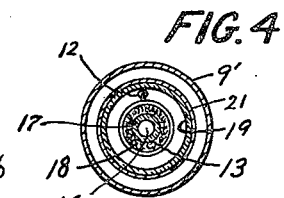

JOHN FRANCIS BERRES, OF MINNEAPOLIS, MINNESOTA.

LUBRICATING-OIL HEATER.

1,332,970.

Specification of Letters Patent.

Patented Mar. 9, 1920.

Application filed September 22, 1919. Serial No. 325,498.

*To all whom it may concern:*

Be it known that I, JOHN F. BERRES, a citizen of the United States, residing at Minneapolis, county of Hennepin, State of Minnesota, have invented certain new and useful Improvements in Lubricating-Oil Heaters, of which the following is a specification.

This invention relates to a novel means for heating oil in the lubricating oil chamber of internal combustion engines. This invention is particularly directed for use in connection with such engines employed in motor vehicles to overcome the increased viscosity of the oil when the engine is exposed to low temperatures. For example, during the cold winter season, the oil in the lubrication chamber, usually in the crank case, becomes what is popularly known as stiff and hard and the circulation of the oil, usually by an oil-pump, is impeded if not stopped. As the function of this oil circulation is to feed oil from the oil chamber to the engine bearings, this stoppage of circulation results in partial or complete lack of lubrication, entailing the burning out of the engine bearings. This objection it has been sought to overcome by the interposition of a by-pass from the engine exhaust leading to and through the oil chamber. This is efficient so long as the engine is running. But, the stoppage of the engine eliminates this heat source, and, on starting, the damage to the engine bearings is effected before the exhaust by-pass achieves its function. Further, it is found that the greatest trouble is that the hard oil collects about the usual strainer or screen which is placed in the oil lubricating chamber. The oil duct leading to the engine bearings receives its oil supply from the oil chamber through this screen. When the oil about this screen is thick or hardened, imperfect passage results and only the less thick oil passes, the thickened or viscous oil immediately collecting about the strainer and stoppage quickly results.

As it has been found that the greatest difficulty with the thickened oil is at the oil screen, it is at this particular place that the application of heat is most effective in overcoming the disadvantages resultant from low temperatures.

Further, it may also be noted that some of the devices which have been proposed to heat oil generally in the oil chamber necessitate at least two additional holes in the crank case and lubricating chamber. Such procedure is extremely undesirable from an automobile engineering standpoint, due to the liability under working conditions to leakage of oil at these points with its attendant serious damage By the employment of this novel device the oil at the screen may be heated and its freely circulating properties thus restored before the engine is started; and, further, this novel construction obviates any necessity for additional openings in the crank case oil chamber, as the electrical wire running to this heat unit enters the oil chamber by way of the usual casting made for the duct leading to the oil pump.

An object of this invention is to provide a means for heating oil adjacent the usual oil screen in the lubrication chamber of an internal combustion engine.

Another object of the invention is to provide means for heating oil in the oil chamber of such an engine without the necessity of making further openings in the oil chamber other than that used for the circulation of oil therefrom to the engine bearings.

Other objects of the invention will more fully appear from the following description and the accompanying drawings and will be particularly pointed out in the annexed claims.

In the drawings:

Figure 1 is a view in side elevation of an internal combustion engine, the crank case being cut away to show the heating unit in position, Fig. 2 is a section through the oil chamber and through the screen and heating unit, Fig. 3 is a section on the line 3—3 of Fig. 2, Fig. 4 is a section on the line 4—4 of Fig. 2, In accordance with the common practice in internal combustion engine construction, an oil chamber 1 is formed on the base of the crank case 2. An opening 3 is provided in the oil chamber so as to afford a means for withdrawing the lubricating oil from the oil chamber to feed it to the engine bearings. It it also common to provide a means for forcibly feeding oil to the bearings and for such purpose an oil-pump is provided. In this selected embodiment of the invention there is disclosed a closure for the opening, such as the usual casting 4, secured by means of bolts 5 passed through the openings 6, to a boss on the end of the crank case 2. This casting 4 is usually provided with an opening 7, directly into the oil chamber, by means of which oil may be withdrawn from the oil chamber and circulated through an oil duct, which is here shown as small pipe 8, to an oil pump 9 and thence to the engine bearings. It is also common to provide a screen adjacent the opening of the oil duct into the chamber for the purpose of screening the oil. These screens are usually hollow and project into the oil chamber such, for example, as the cylindrical screen 9' here shown. This screen 9' is provided with a terminal flange and is apertured to receive therethrough the bolts 5. A gasket 10 is interposed between the casting 4 and the screen flange in order to prevent leakage of oil at the opening in the oil chamber.

In this novel construction an electric heating unit is positioned within the hollow screen or strainer and is electrically connected to the source of electrical energy such as the usual storage battery carried by an automobile. It is deemed preferable to have the single wire lead to this heating unit, the return being by way of a grounded circuit.

The casting 4 is apertured to receive therein in threaded engagement a bolt 11 by which means the heating unit is carried by the casting 4. This bolt is apertured and the electrical wire or lead 12 is inserted therethrough and terminates in the coils 13 of the heating unit. The opposite end of this lead is electrically connected to a source of electrical energy such as the usual storage battery of a motor vehicle. The inner end of this bolt is recessed to receive in threaded engagement the metallic core 14 of the heating unit. The inner end of the core 14 is, in turn, received in threaded engagement in a recess in a stud bolt 15, the outer end of which projects through the end of the cylindrical screen 9'. A nut 16 is turned down on the bolt 15 and securely retains the screen on the heating unit which the screen surrounds or covers. The coils 13 are preferably formed about a glass tube 17 bearing a covering 18 of asbestos which is shellacked. The other end of the coil is electrically connected to the core 14 and thereby grounded through the screen, casting and crank case 2. The coils and core are contained within a second glass tube 19 which is hermetically sealed at each end by a plaster of Paris closure 20. A brass tube 21 covers this glass tube 19. The ends of the glass tube and the brass tube are each closed by means of a cork gasket 22 and metallic washer 23. These closures are held in place by means of the nuts 24 which are threaded upon their respective rods.

The heating unit end of the bolt 11 carries a mica insulator 25. The lead 12 which passes through the aperture in the bolt 11 passes through the upper portion of the bolt 11 and over the mica insulator 25 to the coils 13. This inner lead terminal is therefore held between the mica washer and the inner face of the glass tube 19 and thereby perfectly insulated against grounding.

The heating unit and screen are therefore held in securely assembled relation and the closure or casting carries both. Upon making of electrical connection between the heating unit and the storage battery, the heat is affixed closely adjacent the cold, stiff, or unduly viscous oil collected about the oil screen. This heat is generated before the engine is started and a supply of oil in its normal freely circulating state is secured upon starting of the engine. While one type of heating unit and screen is disclosed herein, obviously other types and styles may be employed.

It is to be understood that the construction disclosed herein is illustrative but not restrictive, and that the same may be modified within the meaning and scope of the claims which follow.

Having thus described my invention, what I claim as new and desire to secure by Letters Patent is:

1. In an internal combustion engine, the combination of a lubricating oil chamber, means for circulating lubricating oil between said chamber and the engine bearings, an oil passage having an opening into the oil chamber and leading to the circulating means, a hollow screen positioned at said opening and projecting within the oil chamber whereby oil passing through the opening is strained, an electric heating unit projecting within said hollow screen, and a source of electrical energy adapted to be connected to said unit to heat oil adjacent said screen.

2. In an internal combustion engine, the combination of a lubricating oil chamber, means for circulating lubricating oil between said chamber and the engine bearings, an oil passage having an opening into the oil chamber and leading to the circulating means, a cylindrical screen positioned at said opening and projecting within the oil chamber whereby oil passing through said opening is strained, a cylindrical electric heating unit positioned within said cylindrical screen, and a source of electrical energy adapted to be connected to said unit to heat oil adjacent said screen.

3. In an internal combustion engine, the combination of a lubricating oil chamber having an opening therein, means for circulating lubricating oil between said chamber and the engine bearings, a closure for said opening, an oil port provided in said closure, an oil duct leading from said port to the circulating means, a hollow screen projecting within the oil chamber to strain oil drawn from the chamber interior through the port, an electric heating unit carried by said closure and positioned within the screen, and a source of electrical energy, the closure being apertured to permit the passage therethrough of an electrical connection between the source of electrical energy and the heating unit whereby the heating unit may heat oil adjacent said screen.

4. In an internal combustion engine, the combination of a lubricating oil chamber having an opening therein, means for circulating lubricating oil between said chamber and the engine bearings, a closure for said opening, an oil port provided in said closure, an oil duct leading from said port to the circulating means, an electric heating unit carried by said closure and projecting within said oil chamber, a hollow screen secured to and surrounding said heating unit, a source of electrical energy adapted to have the electrical connection with the heating unit to heat oil adjacent said screen.

In witness whereof, I have hereunto set my hand this 15th day of September, 1919.

JOHN FRANCIS BERRES.